United States Patent [19]
Takenaka et al.

[11] Patent Number: 5,212,985
[45] Date of Patent: May 25, 1993

[54] ANGULAR RATE SENSOR HAVING A TUNING-FORK STRUCTURE

[75] Inventors: Hiroshi Takenaka, Ikoma; Kazumitsu Ueda, Osaka; Toshihiko Ichinose, Osaka; Jiro Terada, Osaka, all of Japan

[73] Assignee: Matsushita Electric Industrial Co., Ltd., Osaka, Japan

[21] Appl. No.: 643,115

[22] Filed: Jan. 18, 1991

[30] Foreign Application Priority Data

Jan. 18, 1990 [JP] Japan .................................. 2-8603

[51] Int. Cl.$^5$ ............................................. G01P 9/04
[52] U.S. Cl. ..................................... 73/505; 310/329
[58] Field of Search ................... 73/505; 310/329, 370

[56] References Cited

U.S. PATENT DOCUMENTS

| | | | |
|---|---|---|---|
| 4,628,734 | 12/1986 | Watson | 73/505 |
| 4,671,112 | 6/1987 | Kimura et al. | 73/505 |
| 5,014,554 | 5/1991 | Terada et al. | 73/505 |

Primary Examiner—John E. Chapman
Attorney, Agent, or Firm—Pollock, VandeSande & Priddy

[57] ABSTRACT

An angular rate sensor of the type, using oscillation of piezoelectric elements, which includes a pair of sensor elements each including a vibratory piezoelectric detecting element and a vibratory piezoelectric drive element joined together by a joint member in longitudinal alignment and oriented substantially at right angles relative to each other, and a resilient joint member joining the pair of sensor elements at respective free ends of the drive elements so as to form, jointly with the sensor elements, a tuning-fork structure. The turning-fork structure has an improved joint structure between each of the driving elements and the resilient joint member, which has a thickness to width ratio of approximately 3:10 to 7:10 to enable the angular rate sensor to have a low resonance impedance and stable performance characteristics.

6 Claims, 2 Drawing Sheets

ANGULAR RATE SENSOR HAVING A TUNING-FORK STRUCTURE

BACKGROUND OF THE INVENTION

1. Field of the Invention

The present invention relates generally to gyroscopes, and more particularly to an angular rate sensor using piezoelectric oscillating elements.

2. Description of the Prior Art

Conventionally, inertial navigation systems incorporating gyroscopes have been used to determine the bearing of a moving object such as an airplane or a ship. The gyroscopes include a sensor composed mainly of a spinning gyro of the mechanical type. The mechanical gyro is solely satisfactory in insuring a stable direction detection. However, it requires a relatively large and expensive structure and cannot, therefore, be applied to consumer equipment which should be small in size and of relatively low cost.

Another known angular rate sensor is of the vibratory or oscillating type, which includes a sensor element that oscillates in conjunction with an oscillating object or structure to which the sensor element is secured, for detecting the so-called Coriolis force. Most vibrational angular rate sensors have either a piezoelectric mechanism or an electromagnetic mechanism. These sensors are characterized by the motion of a mass constituting a gyro which is a vibratory or oscillating motion rather than a rotary motion of a constant angular rate When an oscillating mass is subjected to an angular rate or velocity, there is produced a force, known as the Coriolis force, in the form of a vibratory torque which is proportional to the angular rate or velocity of the oscillating mass. Thus, vibrational sensing of a torque caused by the Coriolis force provides a measurement of an angular rate. This is the principle of operation of the vibratory angular rate sensors stated above. Most vibratory angular rate sensors devised heretofore utilize piezoelectric members as described for example in the *Journal of the Japan Society for Aerological and Space Sciences*, Vol. 23, No. 257, pp. 339-350.

One such known angular rate sensor which operates based on the principle described above is shown in FIG. 1 of the accompanying drawings. The angular rate sensor generally comprises a pair of vibratory piezoelectric detecting elements 21 and a pair of vibratory piezoelectric drive elements 22 longitudinally aligned end to end, and joined, with the detecting elements 21, respectively, by a pair of joint members 26 to form a pair of sensor elements. An electrode block 23 joins the sensor elements at the free ends of the drive elements 22 to jointly constitute a tuning-fork structure. The angular rate sensor also includes a support rod 24 firmly supporting the tuning-fork structure on a base 25. In assembly, the drive elements 22 and the electrode block 23 are joined by soldering at their bonding surfaces. The bonding surfaces of the respective drive elements 22 and the bonding surfaces of the electrode block 23 have this same width. For soldering, after solder is disposed between one drive element 22 and the electrode block 23 and also between the opposite drive element 22 and the electrode block 23, the drive elements 22 are forced against the electrode block 23 while the electrode block 23 is heated.

The conventional angular rate sensor of the foregoing construction operates as follows. To oscillate the drive elements 22, an alternating drive signal is applied between the outer surfaces of the respective drive elements 22 with their inside surfaces electrically connected together to form a common electrode. The drive elements 22, thus excited, oscillates about the electrode block 23 at the same frequency and opposite phase in a manner generally known as the tuning-fork oscillation.

If the detecting elements 21 oscillating at a velocity v is given an angular motion having an angular rate or velocity w, a force, known as the Coriolis force, is produced on the detecting elements 21. The direction of the Coriolis force is perpendicular to the direction of the velocity v and the magnitude of the Coriolis force is 2mvw (m is an equivalent mass of the detecting elements 21 at their free ends). Since the tuning-fork structure undergoes tuning-fork oscillation, at the moment when one detecting element 21 is oscillating at a velocity v, the opposite detecting element 21 is oscillating at a velocity $-v$. Consequently the Coriolis force produced on the opposite detecting element 21 is $-2mvw$. Thus, the pair of detecting elements 21 are given the Coriolis forces of opposite directions and deform in opposite directions with the result that the surfaces of the pair of sensor elements are electrically charged by the piezoelectric effect. The sensor elements are electrically connected together in such a manner that electric changes produced by the Coriolis forces are added together.

If a tuning-fork oscillation velocity v which is produced by the tuning-fork oscillation is given by $$v = v_0 \cdot \sin w_0 t$$

where $v_0$ is the amplitude of the tuning-fork oscillation velocity, and $w_0$ is the angular cycle of the tuning-fork oscillation, the Coriolis force Fc can be written as $$Fc = 2m \cdot v_0 \cdot w \cdot \sin w_0 t.$$

Thus, the Coriolis force is proportional to the angular rate w and the tuning-fork oscillation velocity $V_0$ and acts in a direction tending to deform the respective detecting elements in the facewise direction. The quantity of surface electric charges on the detecting elements 21 is described by $$Qc \sim v_0 \cdot w \cdot \sin w_0 t.$$

If the tuning-fork oscillation velocity amplitude $v_0$ is controlled at a constant level, we can obtain $$Qc \sim w \cdot \sin w_0 t.$$

Thus, the surface electric charge quantity Qc produced on the detecting elements 21 is obtained as an output proportional to the angular rate w.

If the electrode block 23 of the conventional angular rate sensor which serves as a resilient joint member is relatively thick (i.e. has a relatively large retaining depth), each of the drive elements 22 being oscillated is retained over a relatively large area. With this large retaining depth, the drive elements 22 are unlikely to oscillate smoothly with the result that the angular rate sensor has a relatively large resonance impedance. It is preferable that the resonance impedance should be low. A higher resonance impedance requires a higher driving voltage in order to provide a constant amplitude of oscillation which is attended with the need for a higher source voltage. Furthermore, the angular rate sensor having a high resonance impedance tends to produce an unstable final output.

If the thickness of the resilient joint member is excessively small, each drive element 22 is retained by the joint member only over a relatively small area and hence a sufficient soldering strength is difficult to obtain. With insufficient soldering strength, the drive elements 22 are retained unstably and insufficiently. An angular rate sensor having such unstably soldered drive elements has a high resonance impedance.

SUMMARY OF THE INVENTION

With the foregoing difficulties in view, it is an object of the present invention to provide an angular rate sensor which has a low resonance impedance and is drivable at a high efficiency.

An angular rate sensor of the present invention includes a pair of sensor elements each including a vibratory piezoelectric detecting element and a vibratory piezoelectric drive element joined together by a joint member in longitudinal alignment and oriented substantially at right angles relative to each other, and a resilient joint member joining the pair of sensor elements at respective free ends of the drive elements so as to form, jointly with the sensor elements, a tuning-fork structure. The turning-fork structure has a pair of bonding surfaces each between one of the driving elements and the resilient joint member. The bonding surface has a first extent in a direction of the thickness of the resilient joint member (which is equal to a retaining depth of the drive element of the tuning-fork structure) and a second extent in the widthwise direction of the resilient joint member (which is perpendicular to the retaining depth), the ratio of the first extent to the second extent being in the range of 3:10-7:10.

With this particular bonding surface, the drive elements are stably and firmly joined with the resilient joint member and capable of oscillating freely and smoothly. Thus, the angular rate sensor has a constant and low resonance impedance and hence is capable of detecting an angular rate or velocity efficiently.

The above and other objects, features and advantages of the present invention will become more apparent from the following description when making reference to the detailed description and the accompanying drawings in which preferred structural embodiments incorporating the principles of the present invention are shown by way of illustrative example.

DETAILED DESCRIPTION OF THE PREFERRED EMBODIMENTS

Figure 1:
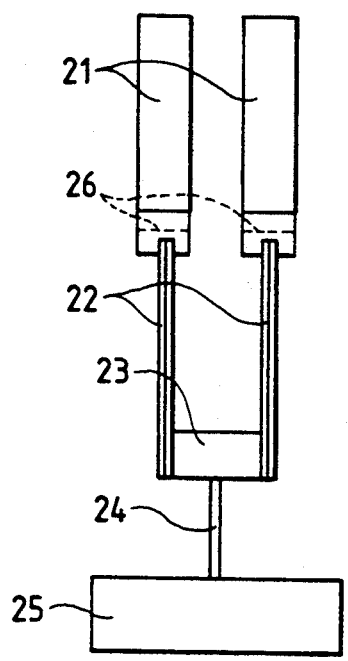
FIG. 1 is a schematic side view of a conventional angular rate sensor.
Figure 2:
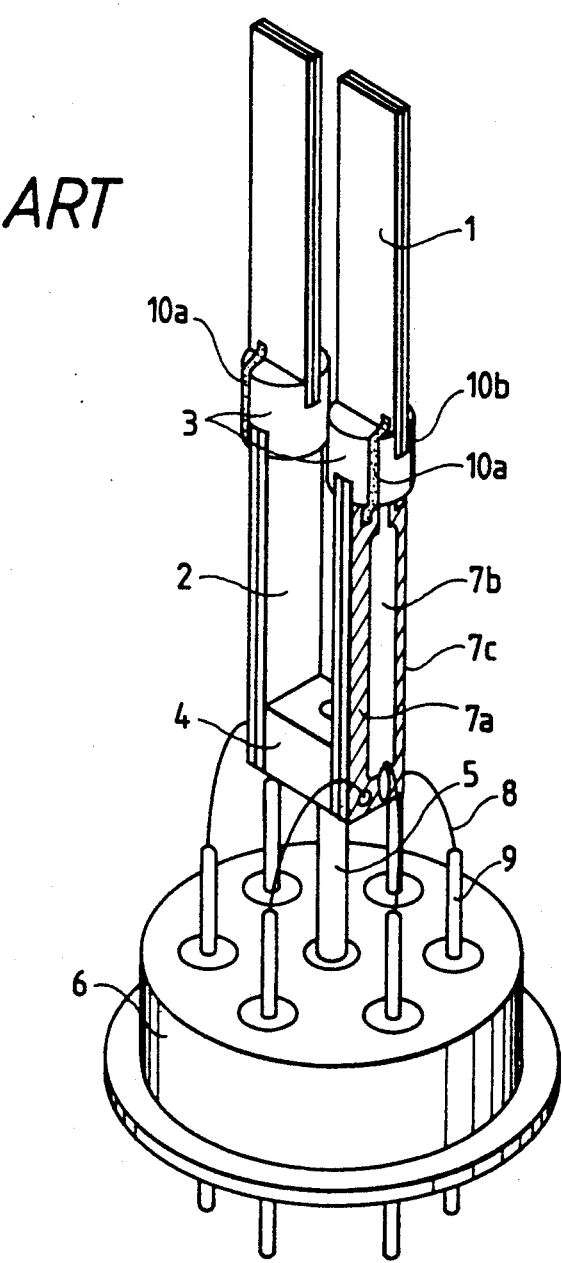
FIG. 2 is a perspective view of an angular rate sensor according to the present invention.

FIG. 2 diagrammatically illustrates an angular rate sensor according to this invention. The angular rate sensor generally includes a pair of identical vibratory piezoelectric detecting elements 1 and a pair of identical vibratory piezoelectric drive elements 2 bonded together by an adhesive with a pair of joint members 3 disposed respectively therebetween in such a manner that the detecting and drive elements 1, 2 are longitudinally aligned end to end and are oriented at right angles relative to each other. The joint members 3 are formed from a synthetic resin such as polyethylene sulfide. The detecting and drive elements 1, 2 thus bonded form a pair of sensor elements. The sensor elements are joined, at free ends of the drive elements 2, by soldering with a resilient member 4 of brass so as to jointly constitute a tuning-fork structure. The tuning-fork structure composed of the detecting elements 1, the drive elements 2 and the resilient joint member 4 is firmly supported by a support rod 5 on a base 6.

The detecting elements 1 and the drive elements 2 have a unimorph structure having a piezoelectric element disposed on one surface of a metal plate made of a conductive KOVAR, or a bimorph structure having two piezoelectric elements disposed on opposite surfaces of a metal plate made of conductive KOVAR. Each of the detecting elements 1 has electrodes on its opposite surfaces. Similarly, each of the drive elements 2 has on its outside surface three electrodes 7a, 7b, 7c and, on its inside surface, an electrode 7b in a position corresponding to the position of the electrode 7b on the outside surface. All the electrodes are made of silver. The electrodes 7a, 7c serves as signal extracting electrodes and are electrically connected by conductors 10a, 10b to the electrodes of the corresponding detecting element 1, on one hand, and are electrically connected by lead wires 8 to lead pins 9, on the other hand.

Although the detecting and drive elements 1, 2 of the angular rate sensor illustrated in FIG. 2 are each composed of a metal plate and at least one piezoelectric element disposed thereon to form a unimorph or bimorph structure, and of a joint member 3 joining the pair of detecting and drive elements 1, 2 end to end, it is possible to construct the pair of detecting and drive elements in such a manner that at least one piezoelectric element is bonded on each of a pair of elongated metal plates disposed substantially at an angle of 90 degrees relative to one another.

When an alternating voltage is applied through the lead pins 9 and the lead wires 8 across the electrodes 7b (only one outside electrode being shown) on each drive element 2, the drive elements 2 oscillate to cause the so-called tuning-fork oscillation. In this instance, the detecting elements joined in right-angled orientation with the drive elements 2 oscillate together with the drive elements 2 being oscillated. The principle of operation of the angular sensor based on which an output signal proportional to an applied angular rate or velocity can be obtained from the detecting elements 1 thus oscillating is the same as the principle described above with respect to the conventional angular rate sensor and, hence, a further description is no longer needed.

Figure 3:
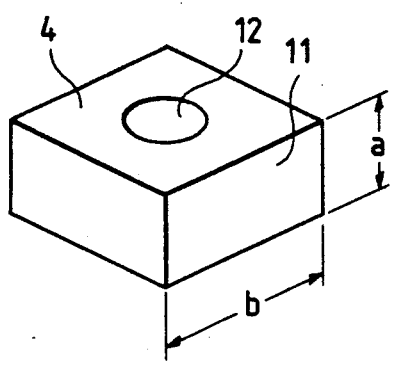
FIG. 3 is a perspective view of a resilient joint member of the angular rate sensor shown in FIG. 2.

As shown in FIG. 3, the resilient joint member 4 is a rectangular body and has a rectangular bonding surface 11 defined by two opposed short sides and two opposed long sides. The short sides each have a length a (the height of the rectangular bonding surface 11 and the thickness of the resilient joint member 4) which is equal to a retaining depth used for retaining the corresponding drive element 2, while the long side each have a length b (width of the rectangular bonding surface 11).

The resilient joint member 4 has a central hole 12 into which the supporting rod 5 (FIG. 2 is firmly received.

The tuning-fork structure shown in FIG. 2 oscillates upon application of an alternating voltage to the electrodes on opposite surfaces of the respective drive elements 2. During that time, the angular rate sensor has a resonance impedance. This resonance impedance varies with the shape of a joint structure between the drive elements 2 and the resilient joint member 4.

Figure 4:
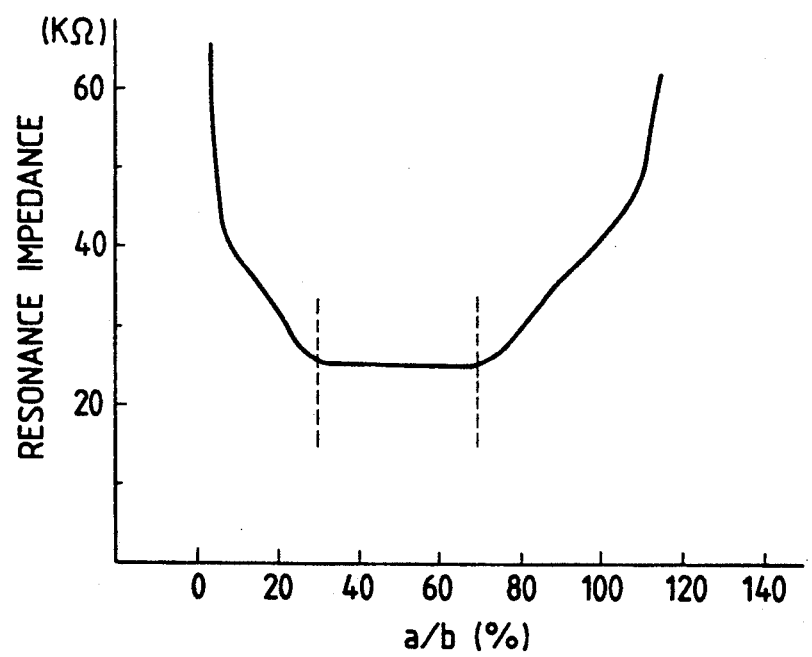
FIG. 4 is a graph showing the relationship between the thickness-to-width ratio of the resilient joint member and the resonance impedance of the corresponding angular rate sensor.

Using various resilient joint members having different thicknesses a and widths b, an experiment was performed to measure changes in resonance impedance with the results shown in FIG. 4. As appears clear from FIG. 4, the resonance impedance is substantially constant and small such as not exceeding 30kΩ when the thickness-to-width ratio (a/b) of the resilient joint member 4 is in the range of 3:10-7:10. A smaller a/b ratio results in an unstable and excessively larger resonance impedance. This is due to unstably retained drive elements 2 resulting from a smaller retaining depth. Likewise, a larger a/b ratio results in an unstable and excessively larger resonance impedance due to a restrained oscillation of the drive elements 2 caused by a larger retaining surface resulting from a larger retaining depth.

Figure 5:
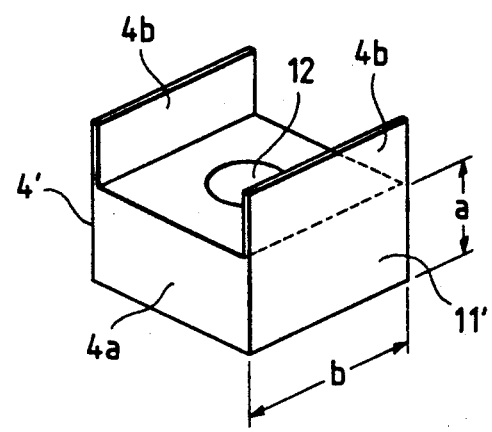
FIG. 5 is a perspective view showing a modified resilient joint member.

A modified resilient joint member 4' shown in FIG. 5 differs from the resilient joint member 4 shown in FIG. 4 in that a rectangular body 4a has a pair of parallel fins 4b upstanding from opposite side edges. Opposite side faces of the body 4a and the corresponding fins 4b jointly form bonding surfaces 11' which are larger than the bonding surfaces 11 of the resilient joint member 4 of FIG. 4. These enlarged bonding surfaces 11' are effective to provide a stable and sufficient bonding strength between the drive elements and the resilient joint member 4'. To provide a constant and small resonance impedance, a portion of each bonding surface 11' which corresponds to one side face of the rectangular body 4a has a thickness-to-width ratio (a/b) ranging from 3:10 to 7:10. The fins 4b are as thin as possible so as to minimize the influence on the resonance impedance of the angular rate sensor.

As described above, a bonding surface between each drive element and the resilient joint member has a first extent in a direction of the thickness of the resilient joint member and a second extent in a widthwise direction of the resilient joint member. The ratio of the first extent to the second extent is in the range of 3:10-7:10. With this particular bonding surface, the drive elements are stably and reliably joined with the resilient joint member and are capable of oscillating in an unrestrained manner. Thus, the angular rate sensor has a low resonance impedance, is drivable by a low voltage, and has stable performance characteristics.

Obviously various minor changes and modifications of the present invention are possible in the light of the above teaching. It is therefore to be understood that within the scope of the appended claims the invention may be practiced otherwise than as specifically described.

What is claimed is:

1. An angular rate sensor comprising:
   a pair of sensor elements each including a vibratory piezoelectric detecting element and a vibratory piezoelectric drive element joined together end to end by a joint member in such a manner that said detecting and drive elements are oscillatable perpendicularly relative to each other; and
   a resilient joint member joining respective free ends of said drive elements so as to form, jointly with said sensor elements, a tuning-fork structure having a longitudinal axis, said resilient lint member having a pair of opposite bonding surfaces facing the respective drive elements, each of said bonding surfaces having a first extent in a direction parallel to said longitudinal axis and a second extent in a direction perpendicular to said longitudinal axis of said tuning-fork structure, the ratio of said first extent to said second extent being in the range of 3:10 to 7:10.

2. An angular rate sensor according to claim 1, wherein said resilient joint member is a rectangular body having two opposite side faces defining said bonding surfaces.

3. An angular rate sensor comprising:
   a pair of sensor elements each including a vibratory piezoelectric detecting element and a vibratory piezoelectric drive element joined together end to end by a joint member in such a manner that said detecting and drive elements are oscillatable perpendicularly relative to each other;
   a resilient joint member joining respective free ends of said drive elements so as to form, jointly with said sensor elements, a tuning-fork structure having a longitudinal axis, said resilient joint member having a pair of opposite bonding surfaces facing the respective drive elements, each of said bonding surfaces having a first extent in a direction parallel to said longitudinal axis and a second extent in a direction perpendicular to said longitudinal axis of said tuning-fork structure, the ratio of said first extent to said second extent being in the range of 3:10 to 7:10; and
   wherein said resilient joint member includes a rectangular body and a pair of thin fins integral with said body and extending in a common direction from two opposite edges of said body, said rectangular body having two opposite side faces defining said bonding surfaces, said fins extending flush with said bonding surfaces, respectively.

4. An angular rate sensor comprising:
   a pair of sensor elements each including a vibratory piezoelectric detecting element and a vibratory piezoelectric drive element joined together end to end in such a manner that said detecting and drive elements are oscillatable perpendicularly relative to each other; and
   a resilient joint member joining respective free ends of said drive elements so as to form, jointly with said sensor elements, a turning-fork structure having a longitudinal axis, said resilient joint member having a pair of opposite bonding surfaces facing the respective drive elements, each of said bonding surfaces having a first extent in a direction along said longitudinal axis and a second extent in a direction parallel to said longitudinal axis of said tuning-fork structure, the ratio of said first extent to said second extent being in the range of 3:10 to 7:10.

5. An angular rate sensor according to claim 4, wherein said resilient joint member is a rectangular body having two opposite side faces defining said bonding surfaces.

6. An angular rate sensor comprising:
   a pair of sensor elements each including a vibratory piezoelectric detecting element and a vibratory piezoelectric drive element joined together end to end in such a manner that said detecting and drive elements are oscillatable perpendicularly relative to each other; and a resilient joint member joining respective free ends of said drive elements so as to form, jointly with said sensor elements, a turning-fork structure having a longitudinal axis, said resilient joint member having a pair of opposite bonding surfaces facing the respective drive elements, each of said bonding surfaces having a first extent in a direction along said longitudinal axis and a second extent in a direction parallel to said longitudinal axis of said turning-fork structure, the ratio of said first extent to said second extent being in the range of 3:10 to 7:10; and wherein said resilient joint member includes a rectangular body and a pair of thin fins integral with said body and extending in a common direction from two opposite edges of said body, said rectangular body having two opposite side faces defining said bonding surfaces, said fins extending flush with said bonding surfaces, respectively.

* * * * *